United States Patent [19]

Nakamura et al.

[11] Patent Number: 5,748,857
[45] Date of Patent: May 5, 1998

[54] IMAGE GRADATION SETTING DEVICE FOR USE IN AN IMAGE FORMING APPARATUS

[75] Inventors: Koji Nakamura; Haruo Yamamoto; Shuji Hayashi, all of Osaka, Japan

[73] Assignee: Mita Industrial Co. Ltd., Osaka, Japan

[21] Appl. No.: 565,429

[22] Filed: Nov. 30, 1995

[30] Foreign Application Priority Data

Dec. 7, 1994 [JP] Japan .................. 6-303722

[51] Int. Cl.$^6$ .............. H04N 1/00; H04N 1/40
[52] U.S. Cl. .............. 395/109; 358/401; 358/458; 358/296
[58] Field of Search .............. 358/458, 455, 358/459, 465, 466, 534, 501–502, 503, 296, 401; 382/270; 395/102, 109, 117

[56] References Cited

U.S. PATENT DOCUMENTS

| | | | |
|---|---|---|---|
| 5,055,943 | 10/1991 | Kishida | 358/458 |
| 5,148,287 | 9/1992 | Kemmochi et al. | 358/458 |
| 5,200,831 | 4/1993 | Tai | 358/458 |
| 5,339,171 | 8/1994 | Fujisawa et al. | 358/458 |
| 5,359,431 | 10/1994 | Ng | 358/458 |

Primary Examiner—Edward L. Coles, Sr.
Assistant Examiner—Fan Lee
Attorney, Agent, or Firm—Jordan and Hamburg

[57] ABSTRACT

An image gradation setting device includes a control density level determining portion for determining based on received image data a control density level indicative of a light amount for each of the first to n-th imaging areas of one imaging element. The control density level determining portion allots only to the first imaging area a control density level in accordance with received image data if the received image data is equal to or lower than a predetermined reference density level, and respectively allots to the first to n-th imaging areas control density levels in accordance with received image data if the received image data is larger than the predetermined reference density level, a minimum control density level of each of the second to n-th imaging areas being made to be larger than a particular control level equivalent to the particular light amount, and a maximum control density level of each of the first to (n–1)-th imaging areas being made to be the particular control level smaller than a control density level equivalent to the predetermined reference density level.

5 Claims, 6 Drawing Sheets

IMAGE GRADATION SETTING DEVICE FOR USE IN AN IMAGE FORMING APPARATUS

BACKGROUND OF THE INVENTION

The present invention relates to an image gradation setting device for use in an image forming apparatus in which an electrostatic latent image is formed by directing a laser beam to a surface of a photosensitive drum, and then developed with toner.

There have been known image forming apparatus in which: an original image is read by an image reading device including a specified number of pixels; a laser beam emitter generates a laser beam in accordance with obtained image data and then projects it to a surface of a photosensitive drum to produce an electrostatic latent image; the produced electrostatic latent image is developed with toner; the developed toner image is transferred to a copy sheet and fixed onto the copy sheet. Also, there have been known image forming apparatus in which a laser beam is generated in accordance with image data transmitted page by page from an external image generator instead of reading an original image. In these apparatuses, image gradation is represented by dither matrix or different sized toner image dots.

Image data of each pixel is generally defined as one of a predetermined density levels, e.g., 256 density levels, which are in the form of a digital signal of 8 bits. In the case of representing an image gradation of 256 density levels by means of the size of toner image dot, it is necessary to provide distinguishable 256 sizes for toner dot. However, it is very difficult to provide distinguishable 256 sized dots in the tiny area.

In recent years, an image representing method has been proposed which distinguishes density levels from one another by representing image data of a plurality of pixels in one imaging element. For example, image data of two adjacent pixels is represented by one imaging element.

The imaging element is formed with two imaging areas, i.e., a first imaging area and a second imaging area. The first imaging area is provided with a basic density and the second imaging area is provided with an additional density to combinedly represent image data from the two adjacent pixels. A laser emitter controls the light amount (control density level) of laser beam to the photosensitive drum surface in accordance with image data of pixels.

FIGS. 6A to 6C show an example of a conventional image representing manner using imaging element consisting of two imaging areas, FIG. 6A showing a relationship between latent image densities and image data of pixels of an image reading devices, FIG. 6B showing a relationship between latent image densities and toner image densities, and FIG. 6C showing a relationship between toner image densities and image data of pixels of an image reading device.

In conventional apparatus, as shown in FIGS. 6A to 6C, the light amount of laser beam or control density levels are determined in accordance with image data or actual density levels of pixels of the image reading device. In this case, for example, there are 256 actual density levels which control density levels are produced in accordance with. Accordingly, 256 control density levels are produced. Control density levels 0 to 180 are provided in the first imaging area of one imaging element as basic densities while levels 181 to 256 are provided in the second imaging area as additional densities. For example, in the case of actual density level 200, the first imaging area is allotted with a control basic density of level 180 and the second imaging area is allotted with a control additional density of level 20 so that the imaging element is allotted with a total control density (broken line) of level 200.

However, as shown in FIG. 6A, the photosensitive drum surface is not accurately exposed in accordance with set control density levels. In particular, in the case of a laser beam having a light amount or control density level lower than a given level, e.g., level 15, in each of the first and second imaging areas, the photosensitive drum surface is not sufficiently exposed to a level equivalent to a control density level. In other words, a latent image having enough to attract toner is not produced in the low control density level portion. As shown in FIG. 6B, consequently, a sufficient toner image density is not produced in the low control density level portion of each of the basic density range and the additional density range. This results in the toner image density jump B0, e.g., from level 180 to level 195, thereby causing a noticeable discontinuity in the gradation of a final reproduced image.

SUMMARY OF THE INVENTION

It is an object of the present invention to provide an image gradation setting device for use in an image forming apparatus which has overcome the problems residing in the prior art.

It is another object of the present invention to provide an image gradation setting device for use in an image forming apparatus which can reliably prevent a discontinuity from appearing in the gradation of a reproduced image.

Accordingly, the invention is directed to an image gradation setting device for use in an image forming apparatus including a light emitter for emitting light, and a photosensitive drum capable of bearing a latent image having densities in accordance with emitted light amounts but having a characteristic of causing a steep rise in the latent image gradation at a particular light amount, the latent image being represented by a predetermined number of imaging elements, each imaging element consisting of first to n-th imaging areas for representing latent image density corresponding to image data of a predetermined number of pixels, the image gradation setting device comprising: an input portion for receiving image data of each pixel, the image data indicating one of a predetermined number of density levels; a control density level determining portion for determining based on received image data a control density level indicative of a light amount for each of the first to n-th imaging areas of one imaging element, the control density level determining portion allotting only to the first imaging area a control density level in accordance with received image data if the received image data is equal to or lower than a predetermined reference density level, and respectively allotting to the first to n-th imaging areas control density levels in accordance with received image data if the received image data is larger than the predetermined reference density level, a minimum control density level of each of the second to n-th imaging areas being made to be larger than a particular control level equivalent to the particular light amount, and a maximum control density level of each of the first to (n−1)-th imaging areas being made to be the particular control level smaller than a control density level equivalent to the predetermined reference density level; and an output portion for outputting a determined control density level to the light emitter.

With the image gradation setting device, if the received image data is larger than the predetermined reference density level, the first to n-th imaging areas control density levels allotted in such way that a minimum control density level of each of the second to n-th imaging areas is larger than a particular control density level equivalent to the particular light amount and a maximum control density level of each of the first to (n−1)-th imaging areas is the particular control level smaller than a control density level equivalent to the predetermined reference density level. Accordingly, each imaging element represents a set image density without any noticeable steep change in the toner density between imaging areas. Thus, a smooth gradation can be represented with an improved distinguishability.

It may be appreciated to use imaging elements each consisting of two imaging areas. In this case, the gradation can be represented by the first and second imaging areas, i.e., an odd-numbered imaging area and its adjacent even-numbered imaging area. Accordingly, the gradation can be represented at twice as high a resolution.

The control density level determining portion may be preferably provided with a table storing allotted control density levels for each of the first to n-th imaging areas. Since allotted control density levels are stored in the table, the determination of control density levels can be output at a higher speed compared to a case where control density levels are calculated using an arithmetic expression.

The above and other objects, features and advantages of the present invention will become more apparent upon a reading of the following detailed description and drawings.

DETAILED DESCRIPTION OF THE INVENTION

Figure 4:
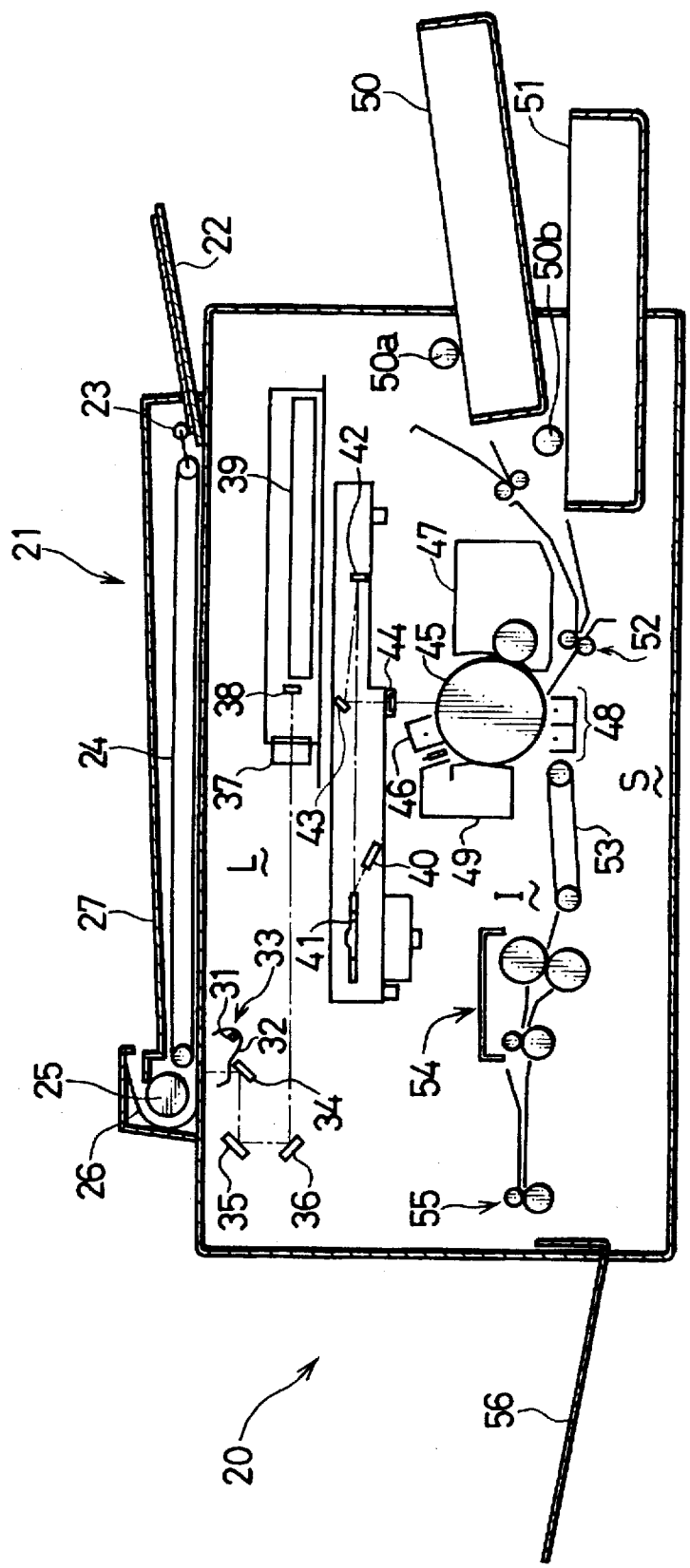
FIG. 4 is a diagram showing an overall construction of an image forming apparatus incorporating the image gradation setting device.

FIG. 4 is an overall construction diagram of an image forming apparatus incorporating an image gradation setting device according to the invention. The image forming apparatus 20 includes an automatic document feeder (ADF) 21, an optical assembly L, an imaging assembly I and a sheet conveying assembly S.

The ADF 21 includes a document table 22, a feed roller 23, a transport belt 24, a discharge roller 25, a discharge guide 26, and a discharged sheet receptacle 27. Documents set on the document table 22 are fed to a specified position on a glass document platen 30 one by one by the feed roller 23 and the transport belt 24. Upon the completion of reading of an image of the document, the document is discharged by the transport belt 24 and the discharge roller 25 onto the discharged sheet receptacle 27 via the discharge guide 26.

The optical system L is provided with a light source 33 which includes a halogen lamp 31 and a reflection mirror 32 and reciprocatingly moves in a sub-scanning direction, mirrors 34, 35, 36, a lens 37 and a reading device 38 including an array of CCDs arranged in a main scanning direction. A scanning beam from the light source 31 is reflected by the document placed on the document platen 30 and read by the reading device 38 via the mirrors 34 to 36 and the lens 37. The read image data is temporarily stored in an unillustrated image memory as density level data represented in the form of a digital signal.

Indicated at 39 is an image gradation setting device for setting a control density level for imaging elements based on actual density levels of pixels. The control density level setting operation will be described in detail later.

The imaging assembly I includes a laser beam emitter 40, a polygonal mirror 41, fixed mirrors 42 and 43, and an SELFOC lens 44. The imaging assembly I also includes a photosensitive drum 45, a charging device 46, a developing device 47, a transfer/separation device 48 and a cleaning device 49.

The laser beam emitter 40 emits a laser beam in accordance with a control density level. The polygonal mirror 41 reflects the laser beam to sweep in the main scanning direction. Further, the laser beam is directed via the fixed mirrors 42, 43 and the SELFOC lens 44 to the surface of the photosensitive drum 45 charged in advance to have a specified potential, with the result that an electrostatic latent image is formed. The electrostatic latent image is developed by the developing device 47, and the developed toner image is transferred to a copy sheet by the transfer/separation device 48.

The sheet conveying assembly S includes, from an upstream side with respect to a sheet conveyance direction, cassettes 50, 51, feed rollers 50a, 51a corresponding to the cassettes 50, 51, a pair of registration rollers 52 where sheet conveyance paths from the cassettes 50, 51 join, a transport belt 53, a fixing device 54, and a pair of discharge rollers 55. A copy sheet is fed from a selected one of the cassettes 50, 51 to the transfer/separation device 48. The transferred image is fixed on the copy sheet by the fixing device 54, and then the copy sheet is discharged onto the discharged sheet receptacle 56.

Figure 2:
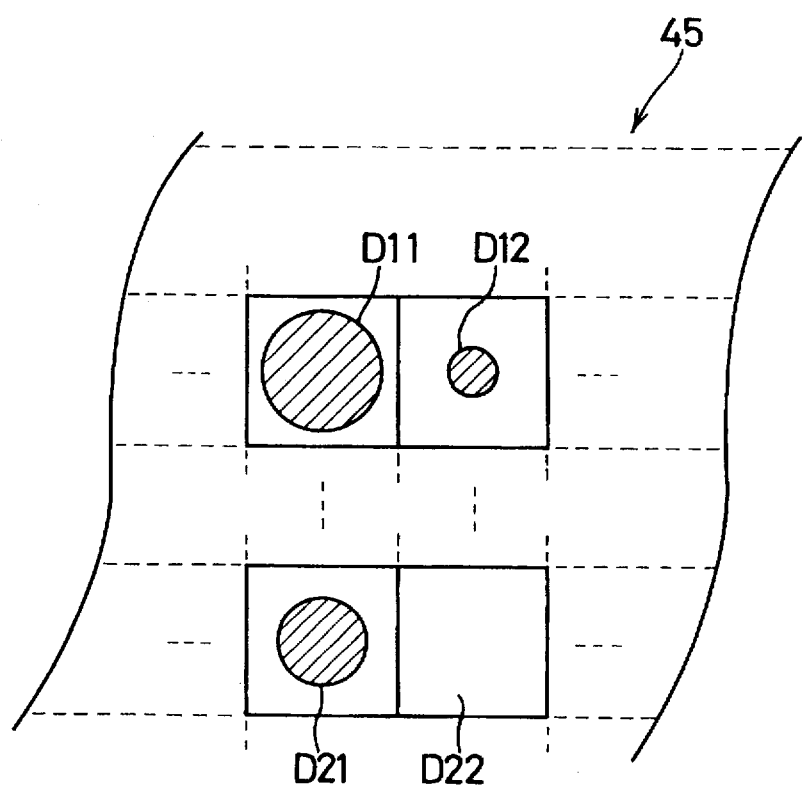
FIG. 2 is a diagram showing a representing manner of image data using imaging elements each consisting of two imaging areas.

FIG. 2 is a diagram showing how an electrostatic latent image is formed in imaging elements. Specifically, FIG. 2 shows a part of the surface of the photosensitive drum 45. In FIG. 2, a zone defined by broken lines corresponds to one main scanning line. In this embodiment, density level data from two adjacent pixels of the reading device 38 is represented in one imaging element which consists of two imaging areas continuously arranged in the main scanning direction of the surface of the photosensitive drum 45.

The imaging elements are continuously arranged along the main scanning direction of the photosensitive drum 45. Density level data from two adjacent pixels of the reading device 38 is represented in one imaging element consisting of a first imaging area and a second imaging area, e.g., D11 and D12, or D21 and D22. More specifically, the first imaging area D11 of one imaging element is provided with a specified basic density of a particular combination of two adjacent pixels and the second imaging area D12 is provided with a specified additional density, if the image data of the particular combination of two adjacent pixels exceeds a predetermined reference level. On the other hand, the first imaging area D21 of another imaging element is provided with a specified basic density of another particular combination of two adjacent pixels and the second imaging area D22 is provided with no additional density, if the image data of the particular combination of two adjacent pixels is lower than the predetermined level.

Figure 3A:
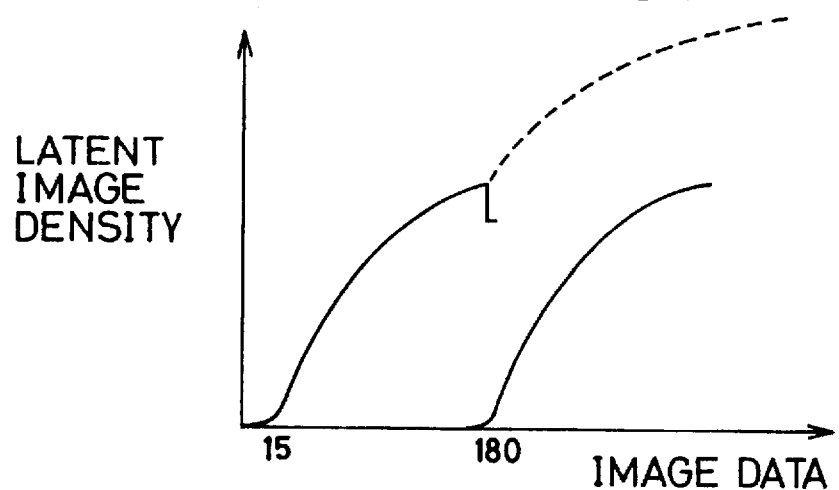
FIGS. 3A to 3C are graphs showing relationships between image data, latent image densities, and toner image densities in the image gradation setting device, FIG. 3A showing a relationship between latent image densities and image data, FIG. 3B showing a relationship between toner image densities and latent image densities, and FIG. 3C showing a relationship between toner image densities and image data.
Figure 3B:
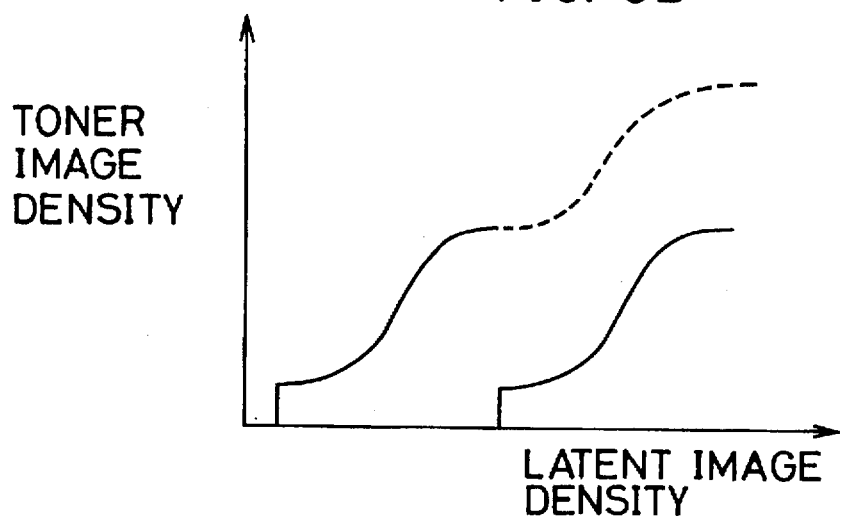
Figure 3C:
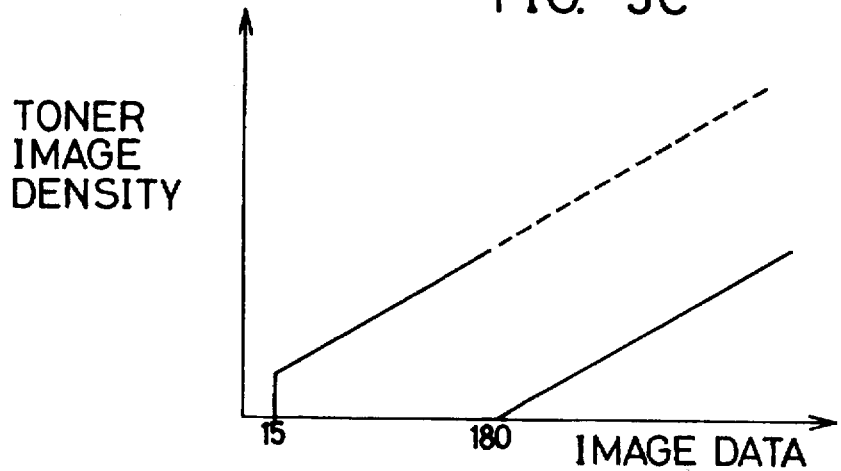

FIGS. 3A to 3C are graphs showing relationships between image data, latent image densities, and toner image densities. FIG. 3A showing a relationship between latent image densities and image data, FIG. 3B showing a relationship between toner image densities and latent image densities, and FIG. 3C showing a relationship between toner image densities and image data.

The image data or actual density levels of the image reading device 38 are divided into a high level group H and a low level group L based on a specified reference density level. In this embodiment, the image data is represented as one of 256 density levels using 8 bits. The low level group L includes density levels 0 to 180 and the high level group H includes density levels 181 to 256. The reason why the reference density level is set at 180 is that usual toner dots can clearly represent a distinguishable gradation in the range between density levels 0 to 180. Generally, the reference density level between the low level group L and the high level group H may be set at the middle or higher of the entire density levels, i.e., level 128 or higher, if the gradation is distinguishable.

Referring again to FIG. 2, the imaging element consisting of the first and second imaging areas D11 and D12 represent a high density level greater than the reference level, i.e., 180. The first imaging area D11 is provided with a maximum basic density. The second imaging area D12 is provided with an additional density. A total of the basic density in the first imaging area D11 and the additional density in the second image area D12 represents a density of a particular combination of adjacent two pixels.

On the other hand, the imaging element consisting of the first and second imaging areas D21 and D22 represents a low density smaller than the reference level. Specifically, only the first imaging area D21 is provided with a basic density corresponding to the low density while the second imaging area D22 is not provided with any additional density.

More specifically, image data or density levels which fall within the low level group L are represented only by the first imaging area of an imaging element or basic density. On the other hand, image data or density levels which fall within the high level group H are represented by the first and second imaging areas of one imaging element, or basic density and additional density.

In this embodiment, a maximum basic density is set at level 165, which is offset from the reference level of 180, i.e., at a level lower than the reference level by 15 levels (see FIG. 3A). An additional density is set at a density level which is equivalent of an excess of image data (actual density level) over the reference level 180.

For example, in the case of image data of density level 175 (falls within the low level group L), the actual density level 175 is represented by providing a basic density (control density) of level 175 in the first imaging area of a corresponding imaging element without providing any additional density in the second imaging area of the imaging element.

On the other hand, in the case of image data of density level 200 (falls within the high level group H), the actual density level 200 is represented by providing a basic density of level 165 in the first imaging area of a corresponding imaging element and providing an additional density of level 35 in the second imaging area of the imaging element.

As mentioned earlier, it has been known that the photosensitive drum surface is not sufficiently exposed by a lower laser beam or control density level, e.g., lower than control density level 15, and toner is consequently rarely attracted to a latent image which has been produced by such lower laser magnitude. Accordingly, in the case of a basic density or an additional density smaller than the given level, a sufficient latent image cannot be produced in the first or second imaging area of an imaging element.

Figure 6A:
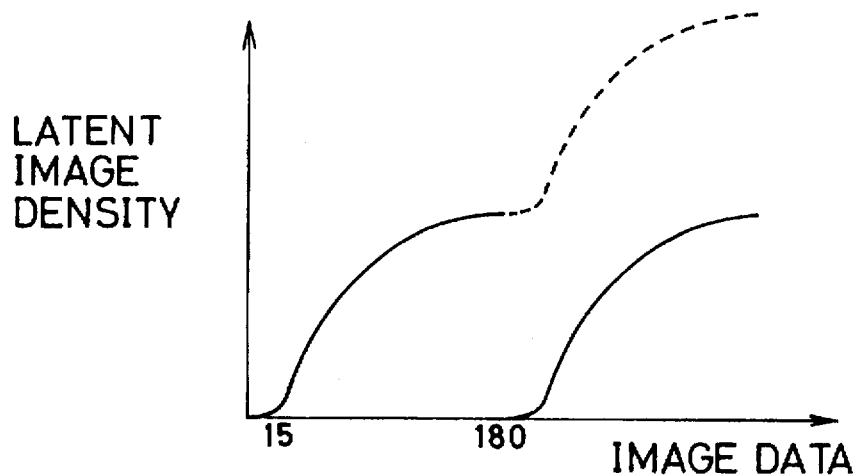
FIGS. 6A to 6C show graphs showing relationships between image data, latent image densities, toner image densities in a conventional image gradation setting device, FIG. 6A showing a relationship between latent image densities and image data, FIG. 6B showing a relationship between latent image densities and toner image densities, and FIG. 6C showing a relationship between toner image densities and image data.
Figure 6B:
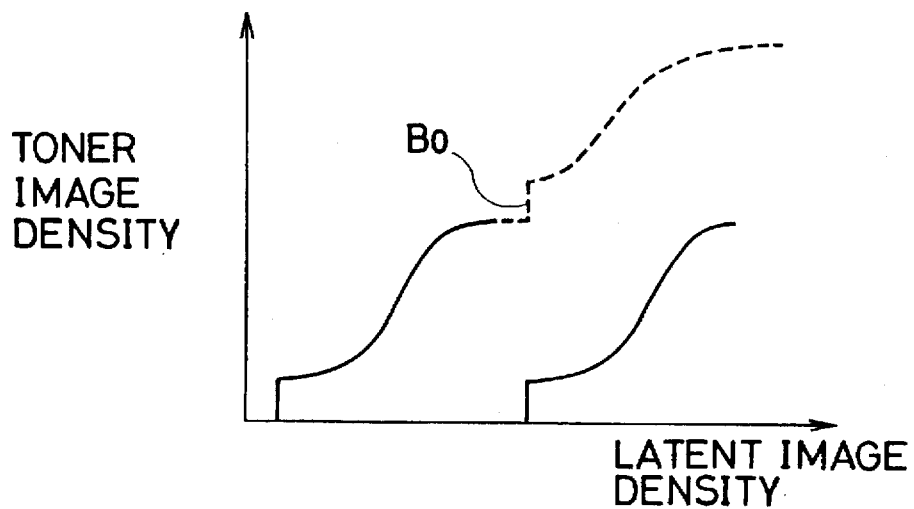
Figure 6C:
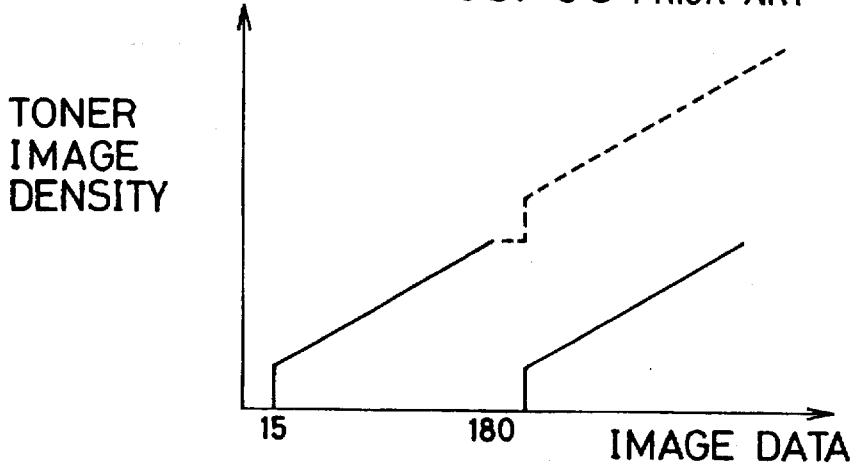

Accordingly, as shown in FIG. 6B, a sufficient toner image density cannot be produced in a lower level portion of each of the basic density range and the additional density range. This results in the toner image density jump B0, e.g., from level 180 to level 195, thereby causing a noticeable discontinuity in the gradation.

For this reason, in this embodiment, in the case of image data of up to density level 180, the control density level is set in such a way that the basic density for the first imaging area of an imaging element is set at level 180 and the additional density for the second imaging area is set at zero.

In the case of image data of level 181 or more, the control density level is set in such a way that the basic density for the first imaging area of an imaging element is set at level 165 and the additional density for the second imaging area is set at a level of: 15+(actual density level−180). For example, in the case of image data of level 181, the basic density is set at level 165 and the additional density is set at level 16 (15+(181−180)).

FIG. 3B shows a relationship between latent image densities and toner image densities. As can be seen from FIG. 3B, there are no steep changes in the curve of toner image densities with respect to latent image densities. In other words, the basic density range and the additional density range are smoothly connected to each other. Further, FIG. 3C shows a relationship between toner image densities and actual density levels. The gradation of toner image density linearly changes with actual density levels. Accordingly, it can be seen that there is no likelihood that a discontinuity appears in the gradation of a reproduced image.

Figure 1:
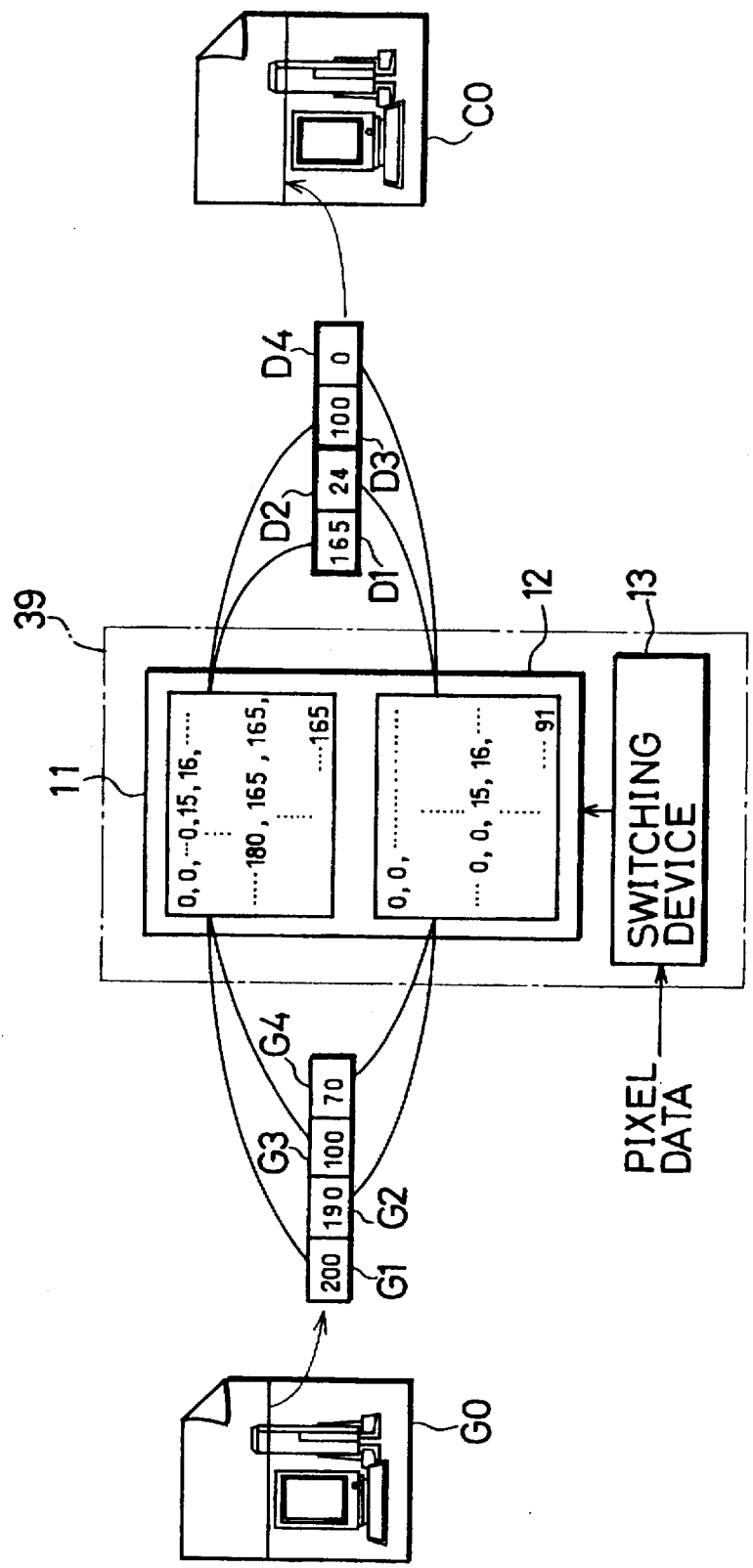
FIG. 1 is a diagram showing a construction of an image gradation setting device embodying the present invention.

FIG. 1 is a diagram showing a construction of the image gradation setting device 39. In this embodiment, image data of two adjacent pixels are represented in one imaging element having two imaging areas. To reduce the processing or calculation time, control density levels for the first and second imaging areas of a particular imaging element are determined based on respective actual density levels of corresponding two adjacent pixels.

Specifically, indicated at G0 and C0 are an original image and a reproduced image, respectively. Let it be assumed that G1 to G4 denote four continuous pixels along a main scanning line on the original image and that D1 to D4 denote first and second imaging areas of corresponding two imaging elements of the photosensitive drum 45. The pixels G1 and G3 corresponds to the respective first imaging areas of the two imaging elements, and the pixels G2 and G4 correspond to the respective second imaging areas of the two imaging element.

The image gradation setting device 39 includes matrix tables realized by ROMs. The matrix tables are respectively adapted for a low level group table 11 and a high level group table 12 (hereafter, merely tables 11 and 12). There is a single output line at the output sides of the tables 11 and 12. The image gradation setting device 39 also includes a switching device 13 which is provided with a binary counter. For 1×2 matrix in this embodiment, the switching device 13 performs the switching such that input data for the first imaging area of an imaging element is fed to the table 11 and input data for the second imaging area of an imaging element is fed to the table 12. Alternatively, a multiplexer may be provided at a data input side for alternately transferring the input data to the tables 11 and 12.

Each of the tables 11 and 12 has addresses 1 to 256. Upon the designation of an address corresponding to input density level, a control density level stored in the designated address is output.

In the table 11, 0 is written in the addresses 1 to 14; 15, 16, ... 179 and 180 are written in the addresses 15 to 180, respectively; and 165 is written in the addresses 181 to 256. It should be appreciated that 15 may be written in the addresses 1 to 14. This enables image representation in the lower portion of the basic density range, levels 1 to 14.

In the table 12, 0 is written in the addresses 1 to 180, and 15, 16, ..., 91 are written in the addresses 181 to 256.

How the density level is set using the image gradation setting device 39 thus constructed will be described with reference to a case where image data or actual density levels of the pixels G1 to G4 are 200, 190, 100 and 70 as an example.

Upon input of the image data of the pixel G1, the table 11 is designated and its address 200 is designated. Since the content stored in the address 200 of the table 11 is 165, this value is output as a control basic density level for the first imaging area D1 of a first corresponding imaging element. A laser beam having a light amount corresponding to control density level 165 is emitted from the laser beam emitter 40 to the position of the first imaging area D1 of the first corresponding imaging element of the photosensitive drum 45.

Upon input of the image data of the pixel G2, the table 12 is designated and its address 190 is designated. Since the content stored in the address 190 of the table 12 is 24, this value is output as a control additional density level for the second imaging area D2 of the first corresponding imaging element. A laser beam having a light amount corresponding to control density level 24 is emitted from the laser beam emitter 40 to the position of the second imaging area D2 of the first corresponding imaging element of the photosensitive drum 45.

Upon input of the image data of the pixel G3, the table 11 is designated and its address 100 is designated. Since the content stored in the address 100 of the table 11 is 100, this value is output as a control basic density level for the first imaging area D3 of a second imaging element. A laser beam having a light amount corresponding to control density level 100 is emitted from the laser beam emitter 40 to the position of the first imaging area D3 of the second corresponding imaging element of the photosensitive drum 45.

Upon input of the image data of the pixel G4, the table 12 is designated and its address 70 is designated. Since the content stored in the address 70 of the table 12 is 0, this value is output as a control additional density level for the second imaging area D4 of the second imaging element. Accordingly, in this case, no laser beam is emitted from the laser beam emitter 40 to the second imaging area D4 of the second corresponding imaging element.

As a result, the control density levels (165, 24, 100, 0) are obtained for the image data (200, 190, 100, 70).

Alternatively, it may be appreciated that an average value of the combination of the pixels G1 (G3) and G2 (G4) is obtained in advance and the thus obtained average value, i.e., the same value, is input to the image gradation setting device 39.

Further, the image data of the first pixel G1 (G3) may be used for the first and second imaging areas D1 and D2 of the first imaging element (the first and second imaging areas D3 and D4 of the second imaging element). More specifically, upon input of image data (e.g., level 200) of the pixel G1, the address 200 of the table 11 is designated and the value 165 is output as a control density level of the first imaging area D1 of the first imaging element. For the second imaging area D2 of the first imaging element, the image data (level 200) of the pixel G1 is input and the address 200 of the table 12 is designated. Accordingly, the value 34 is output as a control additional density level from the address 200 of the table 12. Upon input of image data (e.g., level 100) of the pixel G3, the address 100 of the table 11 is designated and the value 100 is output as a control basic density level for the first imaging area D3 of the second imaging element. For the second imaging area D4 of the imaging element, the image data (level 100) of the pixel G3 is input and the address 100 of the table 12 is designated. Accordingly, the value 0 is output as a control additional density level from the address 100 of the table 12. In this way, the control density levels (165, 34, 100, 0) are obtained for the input image data (200, 190, 100, 70).

Although the control density level for one imaging element is set using two pixels in one line, i.e., 1×2 matrix in this embodiment, it may be set using 1×3, 2×2, or generally i×j matrix. There are required matrix tables as many as i×j. The gradation may be divided by i×j. Division of the gradation is not limited to a division of dividing the gradation exactly by i×j. For example, in the case of i×j=3, the gradation may be divided into 0 to 100 (<256/3), 101 to 200, 201 to 300 (however, in practice, levels more than 256 are not necessary).

In place of using matrix tables in which control density levels are written in advance, control density levels may be calculated each time using an arithmetic circuit.

Although the number of levels of the gradation is 256 in this embodiment, it may be suitably set so as to conform to an apparatus incorporating the image gradation setting device.

Figure 5:
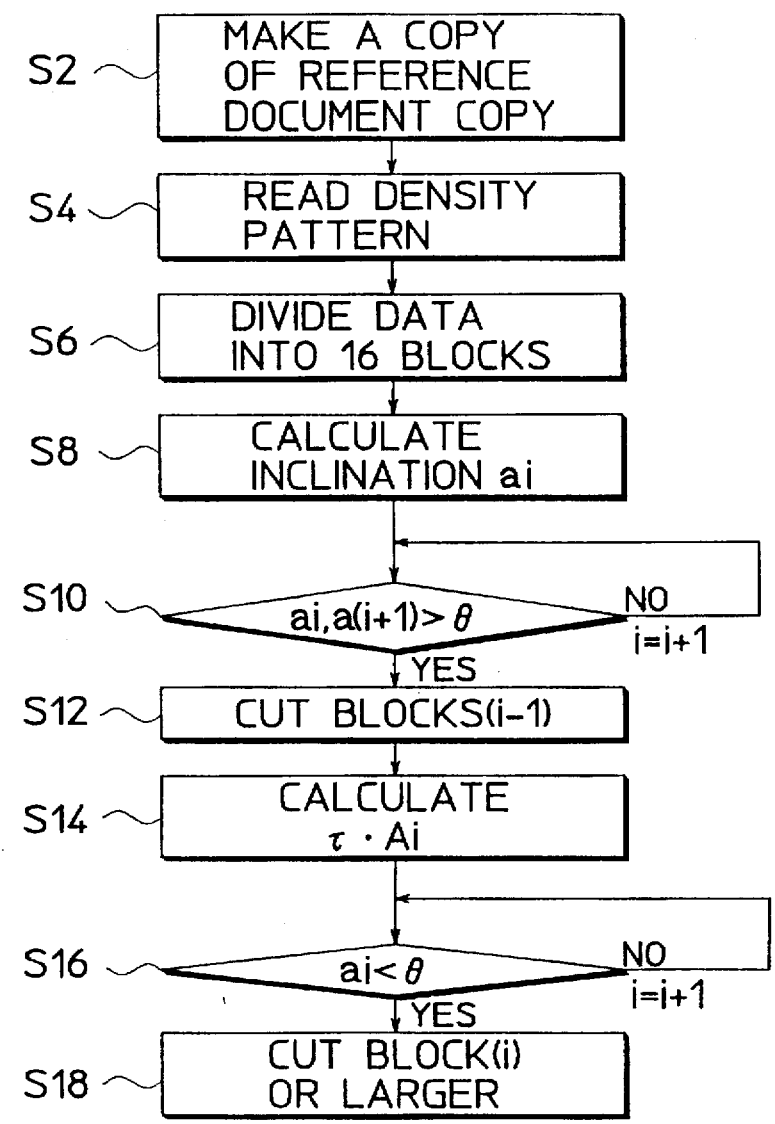
FIG. 5 is a flowchart showing an operation for setting numerical values to be written in a matrix table of the image gradation setting device.

Next, how the numerical values are written in the matrix tables is described with reference to a flowchart shown in FIG. 5. This flowchart is mainly for determining the values 15, 180 used in this embodiment. This operation and the setting of values in the matrix tables are performed at the final stage of manufacturing of the image forming apparatus or during a resetting operation. For this operation, an appropriate setting device is provided in or outside the apparatus. The setting device includes a calculation unit for making blocks of data and calculating an inclination of the data, a discrimination unit for determining an under cut value and an upper cut value by means of comparison with specified threshold values, a data cutting unit, and an arithmetic unit for calculating an offset value, and a control unit which includes a microcomputer or the like for controlling the operations of the respective units in accordance with a program.

First, after placing a reference document having a density pattern which varies from white to black in 256 gradation levels, the image forming apparatus is started (Step S2). In other words, the image of the reference document is copied on a copy sheet using the image forming apparatus. In the case of the color image forming apparatus provided with developing devices for the respective colors, the copy sheet is subjected to the separating and fixing operations after the latent image is developed with toners of the respective colors and copied onto the copy sheet.

The density pattern of the image carried by the copy sheet obtained as described above is read for each pixel by the image scanner (Step S4). The obtained data corresponding to the densities of the respective pixels are divided into 16 blocks, each block including 16 data, and an average value for each block is obtained. In this way, data Ai (i=1 to 16) for the 16 blocks are generated (Step S6). This blocking step is merely to simplify the processing of the 256 data, and is adopted if necessary.

Subsequently, an inclination ai of each block is calculated based on the data Ai (Step S8). For example, the inclination ai is calculated from 16 data in each block (e.g. using the minimum and maximum values of the data in the block). It is then discriminated whether a difference between the inclinations ai and a(i+1) of the two continuous blocks is in excess of a threshold value $\theta$ while the value i is incremented (Step S10). If the difference between the inclinations ai and a(i+1) is in excess of the threshold value $\theta$, the data A(i-1) is taken as an under cut value. Then, the data of the blocks (i-1) and smaller are cut (Step S12). In this case, the data of the blocks (i-1) and smaller may be replaced by Ai.

The data Ai of the block i is multiplied by a constant $\tau$, and the obtained value, $\tau$ Ai, is set as a so-called offset value which corresponds to the aforementioned value 15 (Step S14). The offset value is used in consideration of a shift at a discontinuity which is found in the conventional method. The constant $\tau$ may be 1 or any value close to 1.

Subsequently, it is discriminated whether the inclination ai of the block i is smaller than the threshold value $\theta$ (Step S16). If the inclination ai of the block i is smaller than the threshold value $\theta$ (another threshold value $\theta'$ may be used), the data of blocks i and larger are cut on the assumption that the block i is in the vicinity of a saturation area (Step S18). As a result, a so-called upper cut value which corresponds to the aforementioned value 180 is set in the block (i-1). In this way, the values are obtained which are to be set in the matrix tables 11, 12 provided in the image gradation setting device 39 of the image forming apparatus.

What is claimed is:

1. An image gradation setting device for use in an image forming apparatus including a light emitter for emitting light and a photosensitive drum capable of bearing a latent image having densities in accordance with emitted light amounts but having a characteristic steep rise in latent image gradation at a particular light amount, the latent image being represented by a predetermined number of imaging elements, each imaging element consisting of first to n-th imaging areas for representing latent image density corresponding to image data of a predetermined number of pixels, the image gradation setting device comprising:

an input portion for receiving image data of each pixel, the image data indicating one of a predetermined number of density levels;

a control density level determining portion for determining, based on received image data, a control density level indicative of a light amount for each of the first to n-th imaging areas of one imaging element, the control density level determining portion allotting only to the first imaging area a control density level in accordance with received image data if the received image data is equal to or lower than a predetermined reference density level, and respectively allotting to the first to n-th imaging areas control density levels in accordance with received image data if the received image data is larger than the predetermined reference density level, a minimum control density level of each of the second to n-th imaging areas being made to be larger than a particular control level equivalent to the particular light amount at which said steep rise in latent image gradation occurs, and a maximum control density level of each of the first to (n−1)-th imaging areas being made to be the particular control level smaller than a control density level equivalent to the predetermined reference density level; and an output portion for outputting a determined control density level to the light emitter.

2. An image gradation setting device according to claim 1, wherein n is 2.

3. An image gradation setting device according to claim 1, wherein the control density level determining portion includes a table storing allotted control density levels for each of the first to n-th imaging areas.

4. An image gradation setting device for use in an electrostatic imaging apparatus having a light emitting device and a photosensitive drum, the light emitting device emitting light onto said photosensitive drum and said photosensitive drum bearing a latent image for accepting toner in accordance with light amounts received thereon wherein the photostatic drum has a response characteristic such that a steep rise in toner image density occurs at a first light amount level corresponding to a first density level, the latent image being represented by a predetermined number of imaging elements, each imaging element consisting of first to n-th imaging areas for representing latent image density corresponding to image data of a predetermined number of pixels, said image data ranging up to a maximum density value, said light emitting device emitting light in accordance with density levels for said first to n-th imaging areas, the image gradation setting device comprising:

input means for receiving image data of each of said pixels;

first setting means for outputting density levels for said first to n-th imaging areas when said image data of said predetermined number of pixels is less than or equal to a second density level which greater than said first density level and less than said maximum density value, said first setting means outputting to said first imaging area a density level corresponding to said image data of said predetermine number of pixels and outputting zero density levels to remaining ones of said first to n-th imaging areas;

second setting means for outputting density levels for said first to n-th imaging areas when said image data of said predetermined number of pixels is greater than said second density level, said second setting means outputting to said first imaging area a reduced density level corresponding to said second density level reduced by an offset density level, said offset density level being greater than said first density and less than said second density level, said second setting means outputting to successive ones of said first to n-th imaging areas successive remainders found from a difference between said image data and a total of density levels previously output to said first to n-th imaging areas such that each of said first to n-th imaging areas receives a density level equal to or greater than said offset density level and less than or equal to said second density level.

5. A method for setting density levels of imaging areas of an imaging element in an electrostatic imaging apparatus having a light emitting device and a photosensitive drum, the light emitting device emitting light onto said photosensitive drum and said photosensitive drum bearing a latent image for accepting toner in accordance with light amounts received thereon wherein the photostatic drum has a response characteristic such that a steep rise in toner image density occurs at a first light amount level, said imaging element representing latent image density corresponding to image data of a predetermined number of pixels, said image data ranging up to a maximum density value, the method comprising:

providing an offset density value corresponding to a density level greater than said first light amount level;

providing an upper cut density value greater than said offset density value and less than said maximum density value;

determining if the image data is equal to or less than said upper cut density value;

providing a density level equal to said image data only to a first one of said imaging areas if the image data is equal to or less than said upper cut density value; and providing a density level to said first one of said imaging areas equal to said upper cut density value reduce by said offset density value and providing a density level to a second one of said imaging areas which is equal to said image data reduce by said upper cut density value and increased by said offset density value such that said density level provided to said second one of said imaging area is always greater than said offset density value, if the image data is greater than said upper cut density value.

* * * * *